(12) United States Patent
Harutyunyan et al.

(10) Patent No.: US 8,591,858 B2
(45) Date of Patent: Nov. 26, 2013

(54) EFFECT OF HYDROCARBON AND TRANSPORT GAS FEEDSTOCK ON EFFICIENCY AND QUALITY OF GROWN SINGLE-WALLED NANOTUBES

(75) Inventors: Avetik R. Harutyunyan, Columbus, OH (US); Elena Mora, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 555 days.

(21) Appl. No.: 12/113,814

(22) Filed: May 1, 2008

(65) Prior Publication Data
US 2009/0324484 A1 Dec. 31, 2009

(51) Int. Cl.
*C01B 31/02* (2006.01)
*D01C 5/00* (2006.01)
*D01F 9/12* (2006.01)
*B01J 19/08* (2006.01)
*C09C 1/56* (2006.01)
*B32B 9/00* (2006.01)
*B32B 17/08* (2006.01)

(52) U.S. Cl.
USPC ............... 423/447.3; 423/461; 423/447.2; 423/447.1; 423/445 R; 423/445 B; 423/460; 428/367; 438/99; 977/891; 977/842; 977/750; 977/751; 977/843

(58) Field of Classification Search
USPC .................. 423/447.3, 447.7; 977/843
See application file for complete search history.

(56) References Cited

U.S. PATENT DOCUMENTS 4,770,867 A * 9/1988 Coulon et al. ............. 423/447.3
5,578,543 A * 11/1996 Tennent et al. .............. 502/180
5,587,240 A * 12/1996 Kobayashi et al. ........... 428/367
5,593,740 A    1/1997 Strumban et al.
5,690,997 A * 11/1997 Grow ......................... 427/249.1

(Continued)

FOREIGN PATENT DOCUMENTS

WO    WO 00/17102    3/2000
WO    WO 02/083556   10/2002

(Continued)

OTHER PUBLICATIONS

Hofmann et al., "Low-temperature growth of carbon nanotubes by plasma-enhanced chemical vapor deposition," 2003, Applied Physics Letters, vol. 83, No. 1, pp. 135-137.*

(Continued)

*Primary Examiner* — Guinever Gregorio
(74) *Attorney, Agent, or Firm* — Fenwick & West LLP; Mark Duell (57) ABSTRACT

Methods and processes for synthesizing high quality carbon single-walled nanotubes (SWNTs) are provided. The method provides the means for optimization of amount of carbon precursor and transport gas per unit weight of catalyst. In certain aspects, methods are provided wherein a supported metal catalyst is contacted with a carbon precursor gas at about one atmosphere pressure, wherein SWNTs are synthesized at a growth rate of about 0.002 μm/sec to about 0.003 μm/sec and the SWNTs have a ratio of G-band to D-band in Raman spectra ($I_G$:$I_D$) of greater than about 4. Efficiencies of about 20% can be achieved when contacting the catalyst deposited on a support with a carbon precursor gas with a flow rates of about $4.2 \times 10^{-3}$ mol $CH_4$/sec·g (Fe) at 780° C. Hydrocarbon flow rates of about $1.7 \cdot 10^{-2}$ mol $CH_4$/sec·g (Fe) and higher result in faster carbon SWNTs growth with improved quality. Slower rates of carbon atoms supply (~$4.5 \times 10^{20}$ C atoms/s·g Fe or $6.4 \times 10^{-4}$ mol $CH_4$/sec·g (Fe)) result in the formation of more defective nanotubes.

20 Claims, 5 Drawing Sheets

(56) References Cited

U.S. PATENT DOCUMENTS

| | | | |
|---|---|---|---|
| 6,692,717 B1 * | 2/2004 | Smalley et al. | 423/445 B |
| 6,716,409 B2 | 4/2004 | Hafner et al. | |
| 6,730,284 B2 | 5/2004 | Harutyunyan et al. | |
| 6,752,977 B2 | 6/2004 | Smalley et al. | |
| 6,761,870 B1 | 7/2004 | Smalley et al. | |
| 6,764,874 B1 | 7/2004 | Zhang et al. | |
| 6,869,583 B2 | 3/2005 | Harutyunyan et al. | |
| 6,890,506 B1 | 5/2005 | Harutyunyan et al. | |
| 6,913,789 B2 | 7/2005 | Smalley et al. | |
| 6,949,237 B2 | 9/2005 | Smalley et al. | |
| 6,974,492 B2 | 12/2005 | Harutyunyan et al. | |
| 6,974,493 B2 | 12/2005 | Harutyunyan et al. | |
| 6,986,877 B2 * | 1/2006 | Takikawa et al. | 423/447.3 |
| 7,014,737 B2 | 3/2006 | Harutyunyan et al. | |
| 7,052,668 B2 | 5/2006 | Smalley et al. | |
| 7,090,819 B2 | 8/2006 | Smalley et al. | |
| 7,150,865 B2 | 12/2006 | Harutyunyan et al. | |
| 7,204,970 B2 | 4/2007 | Smalley et al. | |
| 7,214,361 B2 | 5/2007 | Harutyunyan et al. | |
| 7,250,148 B2 * | 7/2007 | Yang et al. | 423/447.3 |
| 7,338,648 B2 | 3/2008 | Harutyunyan et al. | |
| 7,485,600 B2 | 2/2009 | Harutyunyan et al. | |
| 7,651,668 B2 * | 1/2010 | Nakayama et al. | 422/139 |
| 7,767,186 B2 | 8/2010 | Harutyunyan et al. | |
| 7,867,616 B2 | 1/2011 | Harutyunyan | |
| 7,871,591 B2 | 1/2011 | Harutyunyan et al. | |
| 8,163,263 B2 | 4/2012 | Harutyunyan et al. | |
| 2002/0102193 A1 | 8/2002 | Smalley et al. | |
| 2002/0102194 A1 | 8/2002 | Smalley et al. | |
| 2002/0102203 A1 | 8/2002 | Smalley et al. | |
| 2002/0112814 A1 | 8/2002 | Hafner et al. | |
| 2002/0127171 A1 | 9/2002 | Smalley et al. | |
| 2002/0159944 A1 | 10/2002 | Smalley et al. | |
| 2004/0050686 A1 | 3/2004 | Huang et al. | |
| 2004/0223901 A1 | 11/2004 | Smalley et al. | |
| 2004/0265211 A1 | 12/2004 | Dillon et al. | |
| 2005/0079118 A1 | 4/2005 | Maruyama et al. | |
| 2005/0287297 A1 | 12/2005 | Biris et al. | |
| 2006/0078489 A1 | 4/2006 | Harutyunyan et al. | |
| 2006/0093545 A1 | 5/2006 | Maruyama et al. | |
| 2006/0099136 A1 | 5/2006 | Dillon et al. | |
| 2006/0104889 A1 * | 5/2006 | Harutyunyan et al. | 423/447.3 |
| 2006/0223191 A1 | 10/2006 | Harutyunyan et al. | |
| 2006/0239893 A1 | 10/2006 | Zhang et al. | |
| 2006/0245996 A1 | 11/2006 | Xie et al. | |
| 2007/0116629 A1 | 5/2007 | Harutyunyan et al. | |
| 2007/0116632 A1 | 5/2007 | Harutyunyan et al. | |
| 2008/0175786 A1 | 7/2008 | Zhang et al. | |
| 2008/0175787 A1 | 7/2008 | Ma et al. | |
| 2008/0176069 A1 | 7/2008 | Ma et al. | |
| 2008/0213138 A1 * | 9/2008 | Nakayama et al. | 422/146 |
| 2008/0279753 A1 | 11/2008 | Harutyunyan | |
| 2008/0318049 A1 * | 12/2008 | Hata et al. | 428/408 |
| 2009/0220409 A1 * | 9/2009 | Curliss et al. | 423/447.2 |
| 2010/0098904 A1 | 4/2010 | Dae et al. | |
| 2010/0124530 A1 | 5/2010 | Lusk et al. | |
| 2010/0239491 A1 | 9/2010 | Harutyunyan | |

FOREIGN PATENT DOCUMENTS

| | | |
|---|---|---|
| WO | WO 03/040446 | 5/2003 |
| WO | WO 03/057955 | 7/2003 |
| WO | WO 2006/003482 | 1/2006 |
| WO | WO 2006/050903 | 5/2006 |
| WO | WO 2006/091277 | 8/2006 |
| WO | WO 2007/035241 | 3/2007 |
| WO | WO 2007/093337 | 8/2007 |
| WO | WO 2007/125923 | 11/2007 |

OTHER PUBLICATIONS

Kim et al., "Dynamic Growth Rate Behavior of a Carbon Nanotube Forest Characterized by in Situ Optical Growth Monitoring," 2003, Nano Letters, vol. 3, No. 6, pp. 863-865.*

Harutyunyan, A., et al., "CVD Synthesis of Single Wall Carbon Nanotubes Under "Soft" Conditions," NanoLetters, 2002, pp. 525-530, vol. 2, No. 5.

Ivanov, V., et al., "The Study of Carbon Nanobutules Produced by Catalytic Method," Chemical Physics Letters, Jun. 24, 1994, pp. 329-335, vol. 223.

Journet, C., et al., "Large-Scale Production of Single-Walled Carbon Nanotubes by the Electric-Arc Technique," Nature, Aug. 21, 1997, pp. 756-758, vol. 388.

Li, W. Z., et al., "Large-Scale Synthesis of Aligned Carbon Nanotubes," Science, Dec. 6, 1996, pp. 1701-1703, vol. 274.

Thess, A., et al., "Crystalline Ropes of Metallic Carbon Nanotubes," Science, Jul. 26, 1996, pp. 483-487, vol. 273.

Mora, E. et al., "Study of Single-Walled Carbon Nanotubes Growth via the Catalyst Lifetime," Journal of Physical Chemistry, 2008, vol. 112, pp. 4805-4812.

PCT International Search Report and Written Opinion, PCT Application No. PCT/US2009/040959, Apr. 13, 2010, 5 pages.

* cited by examiner

EFFECT OF HYDROCARBON AND TRANSPORT GAS FEEDSTOCK ON EFFICIENCY AND QUALITY OF GROWN SINGLE-WALLED NANOTUBES

FIELD OF INVENTION

The present invention relates to methods for the synthesis of carbon single-walled nanotubes using chemical vapor deposition method.

BACKGROUND

Carbon nanotubes are hexagonal networks of carbon atoms forming seamless tubes with each end capped with half of a fullerene molecule. Presently, there are three main approaches for the synthesis of single- and multi-walled carbon nanotubes. These include the electric arc discharge of graphite rod (Journet et al. Nature 388: 756 (1997)), the laser ablation of carbon (Thess et al. Science 273: 483 (1996)), and the chemical vapor deposition of hydrocarbons (Ivanov et al. Chem. Phys. Lett 223: 329 (1994); Li et al. Science 274: 1701 (1996)). Multi-walled carbon nanotubes can be produced on a commercial scale by catalytic hydrocarbon cracking while single-walled carbon nanotubes are still produced on a gram scale. Present methods produce both single-walled and multi-walled carbon nanotubes, as well as other contaminants, and purification of SWNTs can be time consuming and expensive.

Generally, single-walled carbon nanotubes are preferred over multi-walled carbon nanotubes because they have unique mechanical and electronic properties. Defects are less likely to occur in single-walled carbon nanotubes because multi-walled carbon nanotubes can survive occasional defects by forming bridges between unsaturated carbon valances, while single-walled carbon nanotubes have no neighboring walls to compensate for defects. Defect-free single-walled nanotubes are expected to have remarkable mechanical, electronic and magnetic properties that could be tunable by varying the diameter, and chirality of the tube.

The methods described above still produce significant by-products and/or low yields of SWNTs. Thus, there is a need for methods and processes for controllable synthesis of high quality carbon single walled nanotubes. Accordingly, the present invention provides novel methods and processes for the synthesis of high quality SWNTs.

SUMMARY

The present invention provides methods and processes for growing single-walled carbon nanotubes with high quality.

The methods use catalysts selected from a Group V metal, a Group VI metal, a Group VII metal, a Group VIII metal, a lanthanide, or a transition metal or combinations thereof. The catalyst can be supported on a powdered oxide, such as $Al_2O_3$, $SiO_2$, MgO and the like, wherein the catalyst and the support are in a ratio of about 1:1 to about 1:500. The supported catalyst can be used for the synthesis of SWNTs. The reaction temperature, the reaction duration, and other reaction conditions can be altered until high-quality SWNTs are produced and the production of other carbon species, such as multi-walled carbon nanotubes, amorphous carbon, disordered carbon, or graphite is minimized.

In one aspect, the invention provides methods for synthesizing carbon single-walled nanotubes (SWNTs) wherein Fe:Mo metal catalyst is supported on alumina and contacted with a carbon precursor gas to synthesize SWNTs at a high rate and with high quality.

In another aspect, the invention provides methods for synthesizing carbon single-walled nanotubes (SWNTs) wherein metal catalyst on a support in a ratio of about 1:30 to about 1:40 are contacted with a carbon precursor gas and high quality SWNTs are synthesized at about atmosphere pressure. The flow rate of the carbon precursor gas can be selected such that the carbon nanotubes are produced at a high growth rate. The growth rate of the carbon nanotubes can be about 0.0015 to about 0.004 μm/sec, or more preferably about 0.002 to about 0.004 μm/sec. In certain aspects, the growth rate of carbon nanotubes can be about 0.003 μm/sec.

BRIEF DESCRIPTION OF DRAWINGS

FIG. 3A depicts the Raman spectra for SWCNT samples grown on Fe:Mo:$Al_2O_3$ at 780° C. and 80 sccm of $CH_4$ by sequential introduction of $^{12}CH_4$ and $^{13}CH_4$ gases for durations: (b1) 2 min of $^{12}CH_4$ and 20 min of $^{13}CH_4$, (b2) 8 min of $^{12}CH_4$ followed by 20 min of $^{13}CH_4$, (b3) 14 min of $^{12}CH_4$ followed by 20 min of $^{13}CH_4$, (b4) 23 min of $^{12}CH_4$ followed by 20 min of $^{13}CH_4$. FIG. 3B depicts the Raman spectra for SWCNTs grown on Fe:Mo:$Al_2O_3$ catalyst with 20 min of $^{12}CH_4$ and with 20 min of $^{13}CH_4$. The insets are magnifications showing the "D-band".

DETAILED DESCRIPTION

I. Definitions

Unless otherwise stated, the following terms used in this application, including the specification and claims, have the definitions given below. It must be noted that, as used in the specification and the appended claims, the singular forms "a," "an" and "the" include plural referents unless the context clearly dictates otherwise. Definition of standard chemistry terms may be found in reference works, including Carey and Sundberg (1992) "Advanced Organic Chemistry $3^{rd}$ Ed." Vols. A and B, Plenum Press, New York, and Cotton et al. (1999) "Advanced Inorganic Chemistry $6^{th}$ Ed." Wiley, New York.

The terms "single-walled carbon nanotube" or "one-dimensional carbon nanotube" are used interchangeable and refer to cylindrically shaped thin sheet of carbon atoms having a wall consisting essentially of a single layer of carbon atoms, and arranged in an hexagonal crystalline structure with a graphitic type of bonding.

The terms "metalorganic" or "organometallic" are used interchangeably and refer to co-ordination compounds of organic compounds and a metal, a transition metal or a metal halide.

II. Overview

The present invention discloses methods and processes for the synthesis of high quality carbon single-wall nanotubes (SWNT) and structures using the carbon vapor deposition method. Catalyst supported on powdered $Al_2O_3$ is used for the synthesis of SWNTs. The catalyst preferably is Fe and at least one other metal, such as Mo, Ni, and the like. The synthesis is preferably carried out at about atmospheric pressure and the flow rate of the hydrocarbon precursor gas is selected such that efficiency and quality of SWNTs produced is improved. The methods thus minimize the formation of amorphous or disordered carbon and the formation of multi-layered carbon.

III. The Catalyst

The catalyst composition can be any catalyst composition known to those of skill in the art. Conveniently, the catalyst can be a metal or an alloy, such as, for example, iron, iron oxide, molybdenum, or a ferrite such as cobalt, nickel, chromium, yttrium, hafnium or manganese. The catalyst useful according to the invention will preferably have an average overall particle size of up to 50 nm to about 1 μm, although, in general, the particle sizes for individual particles can be from about 400 nm to about 1 μm.

The function of the catalyst when used in the carbon nanotube growth process is to decompose the carbon precursors and aid the deposition of ordered carbon. The methods and processes of the present invention preferably use metal nanoparticles as the metallic catalyst. The metal or combination of metals selected as the catalyst can be processed to obtain the desired particle size and diameter distribution. The catalyst can then be separated by being supported on a material suitable for use as a support during synthesis of carbon nanotubes as described below. As known in the art, the support can be used to separate the catalyst particles from each other thereby providing the catalyst materials with greater surface area in the catalyst composition. Such support materials include powders of crystalline silicon, polysilicon, silicon nitride, tungsten, magnesium, aluminum and their oxides, preferably aluminum oxide, silicon oxide, magnesium oxide, or titanium dioxide, or combination thereof, optionally modified by additional elements, are used as support powders. Silica, alumina and other materials known in the art may be used as support, preferably alumina is used as the support.

The catalyst can be selected from a Group V metal, such as V or Nb, and mixtures thereof, a Group VI metal including Cr, W, or Mo, and mixtures thereof, VII metal, such as, Mn, or Re, Group VIII metal including Co, Ni, Ru, Rh, Pd, Os, Ir, Pt, and mixtures thereof, or the lanthanides, such as Ce, Eu, Er, or Yb and mixtures thereof, or transition metals such as Cu, Ag, Au, Zn, Cd, Sc, Y, or La and mixtures thereof. Specific examples of mixture of catalysts, such as bimetallic catalysts, which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Pt—Cr, Pt—W, and Pt—Mo. Preferably, the metal catalyst is iron, cobalt, nickel, molybdenum, or a mixture thereof, such as Fe—Mo, Fe—Ni and Ni—Fe—Mo.

The ratio of each metal to the total catalyst is preferably from about 1:50 to about 50:1 (mol/mol), more preferably about 1:5 to about 5:1 (mol/mol), and even more preferably about 1:2 to about 1:4 (mol/mol). Thus, for example, if the catalyst is the bimetallic Fe—Mo, the ratio of Fe:Mo can be 1:1, 2:3, 1:2, 3:2, 5:1, 6:1 and the like. Similarly, if the catalyst is the trimetallic Fe—Mo—Ni, the ratio of Fe:Mo:Ni can be 1:1:1, 3:2:1, 5:1:1, 10:2:1, and the like.

The metal, bimetal, or combination of metals can be used to prepare the catalyst as nanoparticles, preferably having defined particle size and diameter distribution. The catalyst can be prepared using the literature procedure described in Harutyunyan et al., NanoLetters 2, 525 (2002). Alternatively, the catalyst can be prepared by thermal decomposition of the corresponding metal salt added to a passivating salt, and the temperature of the solvent adjusted to provide the metal nanoparticles, as described in the co-pending and co-owned U.S. patent application Ser. No. 10/304,316, or by any other method known in the art. The size and diameter of the catalyst can be controlled by using the appropriate concentration of metal in the passivating solvent and by controlling the length of time the reaction is allowed to proceed at the thermal decomposition temperature. The metal salt can be any salt of the metal, and can be selected such that the melting point of the metal salt is lower than the boiling point of the passivating solvent. Thus, the metal salt contains the metal ion and a counter ion, where the counter ion can be nitrate, nitride, perchlorate, sulfate, sulfide, acetate, halide, oxide, such as methoxide or ethoxide, acetylacetonate, and the like. For example, the metal salt can be iron acetate ($FeAc_2$), nickel acetate ($NiAc_2$), palladium acetate ($PdAc_2$), molybdenum acetate ($MoAc_3$), and the like, and combinations thereof. The melting point of the metal salt is preferably about 5° C. to 50° C. lower than the boiling point, more preferably about 5° C. to about 20° C. lower than the boiling point of the passivating solvent. The solvent can be an ether, such as a glycol ether, 2-(2-butoxyethoxy)ethanol, $H(OCH_2CH_2)_2O(CH_2)_3CH_3$, which will be referred to below using the common name dietheylene glycol mono-n-butyl ether, and the like.

Catalysts having an average particle size of about 0.01 nm to about 20 nm, more preferably about 0.1 nm to about 3 nm and most preferably about 0.3 nm to 2 nm can be prepared. The catalysts can thus have a particle size of 0.1, 1, 2, 3, 4, 5, 6, 7, 8, 9, or 10 nm, and up to about 20 nm. In another aspect, the catalysts can have a range of particle size, or diameter distribution. For example, the catalysts can have particle sizes in the range of about 0.1 nm and about 5 nm in size, about 3 nm and about 7 nm in size, or about 5 nm and about 11 nm in size.

The size and distribution of catalyst produced can be verified by any suitable method. One method of verification is transmission electron microscopy (TEM). A suitable model is the Phillips CM300 FEG TEM that is commercially available from FEI Company of Hillsboro, Oreg. In order to take TEM micrographs of the metal nanoparticles, 1 or more drops of the metal nanoparticle/passivating solvent solution are placed on a carbon membrane grid or other grid suitable for obtaining TEM micrographs. The TEM apparatus is then used to obtain micrographs of the nanoparticles that can be used to determine the distribution of nanoparticle sizes created.

In another method, the size of the catalyst particle, before and after being supported, can be determined using superconducting quantum interference device (SQUID) magnetometer, as described in the co-pending and co-owned application U.S. Ser. No. 10/992,275. SQUID magnetometers are commercially available from companies such as Biomagnetic Technologies Inc., San Diego, Calif. and Siemens AG of Germany, and include both single and multichannel devices that are capable of detecting magnetic fields at plurality of locations simultaneously. SQUID magnetometers generally comprise a superconducting pick up coil system and a detector system (the SQUID) which itself comprises one or two Josephson junctions inserted into a loop of superconducting wire. The magnetic flux within such loops is quantized and changes in the magnetic field experienced by the pick up coils cause a measurable change in the current flowing through the detector. The SQUID magnetometers are capable of measuring very low magnetic fields, for example, as low as $10^{-14}$ Tesla. The technique thus finds use in a variety of fields.

It has been found that the magnetization curves for catalysts having particle sizes of less than about 1.5 nm is paramagnetic, and the magnetization curves for particle sizes greater than about 2 nm is superparamagnetic, and greater than 4 nm is ferromagnetic Thus, in one aspect, the evolution of magnetic properties of the catalyst particles can be used for synthesis of the catalyst particles with the desired size. The metal/support material molar ratio can be varied if the magnetization curves observed in SQUID are not the same as the magnetization curves expected for the desired particle sizes. Thus, if the desired average particle size is about 2 nm or greater, such as between 2.1 nm and about 3 nm, then the variation of the metal/support material ratio is continued until the SQUID measurements provide magnetization curves indicating that the particles are superparamagnetic.

The catalysts, such as those formed by thermal decomposition described in detail above, and optionally characterized by SQUID, can then be supported on solid supports. The solid support can be alumina, silica, MCM-41, MgO, $ZrO_2$, aluminum-stabilized magnesium oxide, zeolites, or other oxidic supports known in the art, and combinations thereof. For example, $Al_2O_3$—$SiO_2$ hybrid support could be used. Preferably, the support is aluminum oxide ($Al_2O_3$) or silica ($SiO_2$). The oxide used as solid support can be powdered thereby providing small particle sizes and large surface areas. The powdered oxide can preferably have a particle size between about 0.01 μm to about 100 μm, more preferably about 0.1 μm to about 10 μm, even more preferably about 0.5 μm to about 5 μm, and most preferably about 1 μm to about 2 μm. The powdered oxide can have a surface area of about 50 to about 1000 $m^2/g$, more preferably a surface area of about 200 to about 800 $m^2/g$. The powdered oxide can be freshly prepared or commercially available.

In one aspect, the catalysts are supported on solid supports via secondary dispersion and extraction. Secondary dispersion begins by introducing particles of a powdered oxide, such as aluminum oxide ($Al_2O_3$) or silica ($SiO_2$), into the reaction vessel after the thermal decomposition reaction. A suitable $Al_2O_3$ powder with 1-2 μm particle size and having a surface area of 300-500 $m^2/g$ is commercially available from Alfa Aesar of Ward Hill, Mass., or Degussa, N.J. Powdered oxide can be added to achieve a desired weight ratio between the initial amount of the catalyst and the powdered oxide used to form the supported catalysts. Typically, the weight ratio can be between about 1:10 and about 1:50. For example, if 100 mg of iron acetate is used as the starting catalyst material, then about 320 to 480 mg of powdered oxide can be introduced into the solution. The weight ratio of catalyst to powdered oxide can be between about 1:10 and 1:20, such as, for example, 1:11, 1:12, 2:25, 3:37, 1:13, 1:14, 1:15, 1:16, 1:17, and the like.

As will be apparent to those of skill in the art, the supported catalyst thus prepared can be stored for later use. In another aspect, the catalyst can be previously prepared, isolated from the passivating solvent, and purified, and then added to a powdered oxide in a suitable volume of the same or different passivating solvent. The metal nanoparticles and powdered oxide can be homogenously dispersed, extracted from the passivating solvent, and processed to increase the effective surface area as described above. Other methods for preparing the metal nanoparticles and powdered oxide mixture will be apparent to those skilled in the art.

The supported catalysts thus formed can be used as a growth catalyst for synthesis of carbon nanotubes, nanofibers, and other one-dimensional carbon nanostructures using the chemical vapor deposition (CVD) process.

IV. Carbon Precursors

The carbon nanotubes can be synthesized using carbon precursors, such as carbon containing gases. In general, any carbon containing gas that does not pyrolize at temperatures up to 800° C. to 1000° C. can be used. Examples of suitable carbon-containing gases include carbon monoxide, aliphatic hydrocarbons, both saturated and unsaturated, such as methane, ethane, propane, butane, pentane, hexane, ethylene, acetylene and propylene; oxygenated hydrocarbons such as acetone, and methanol; aromatic hydrocarbons such as benzene, toluene, and naphthalene; and mixtures of the above, for example carbon monoxide and methane. In general, the use of acetylene promotes formation of multi-walled carbon nanotubes, while CO and methane are preferred feed gases for formation of single-walled carbon nanotubes. The carbon-containing gas may optionally be mixed with a diluent gas such as hydrogen, helium, argon, neon, krypton, xenon, nitrogen, or a mixture thereof.

V. Synthesis of Carbon Nanotubes

Figure 1:
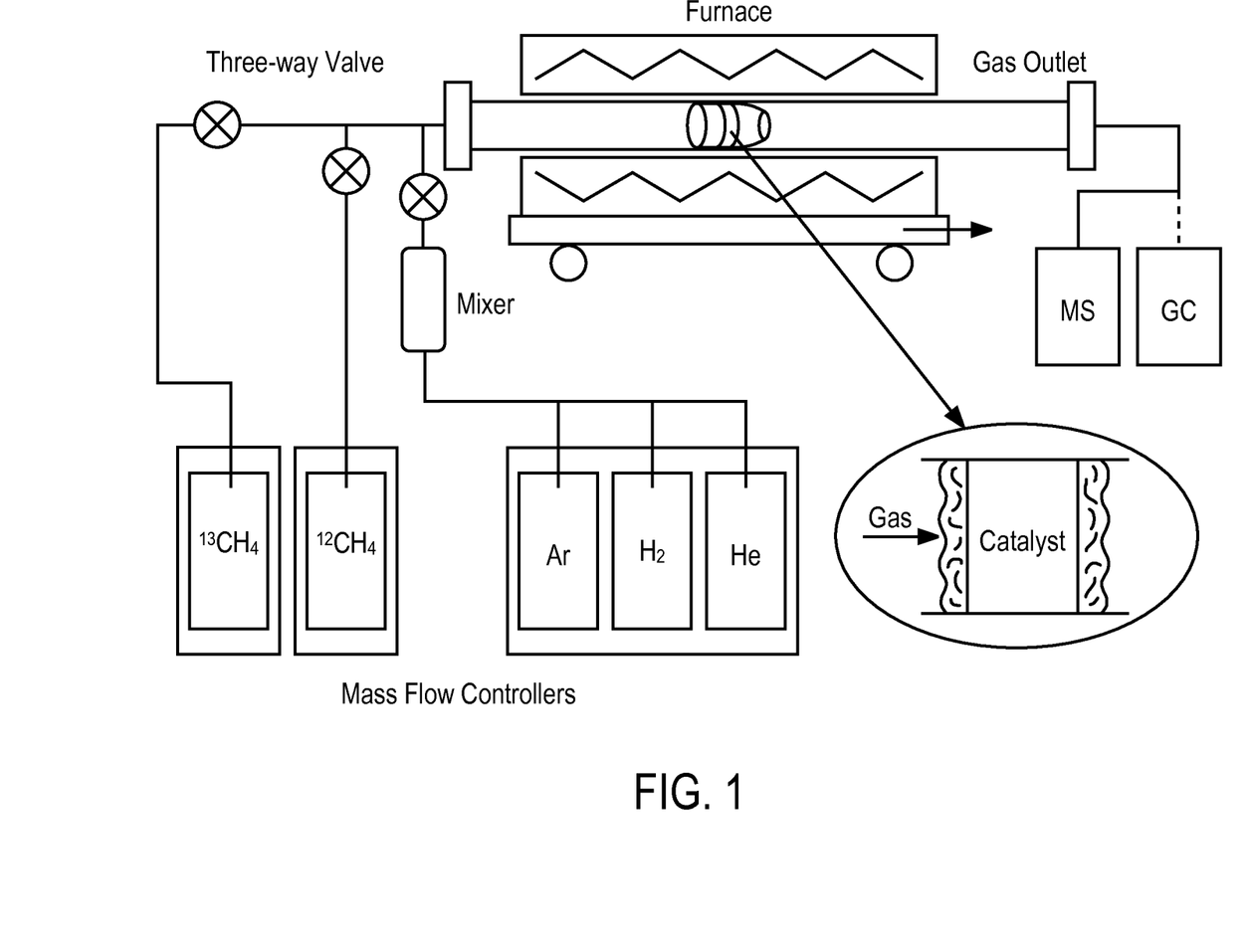
FIG. 1 depicts a typical setup of the apparatus used for the synthesis of single-walled carbon nanotubes.

The methods and processes of the invention provide for the synthesis of SWNTs having high quality. In one aspect of the invention, the catalyst supported on powdered oxides can be placed within the reaction chamber, as illustrated in FIG. 1, and can be contacted with the carbon source at the reaction temperatures according to the literature methods described in Harutyunyan et al., NanoLetters 2, 525 (2002). Alternatively, the catalysts supported on the oxide powder can be aerosolized and introduced into the reactor maintained at the reaction temperature. Concurrently, the carbon precursor gas can be introduced into the reactor. The flow of reactants within the reactor can be controlled such that the deposition of the carbon products on the walls of the reactor is reduced. The carbon nanotubes thus produced can be collected and separated.

In one aspect of the invention, the carbon source gas, such as methane or carbon monoxide, is delivered to the reaction chamber at about one atmosphere pressure (750 torr). The pressure of the carbon source gas can be about 700 torr to about 800 torr, preferably about 730 torr to about 770 torr. The flow rate of the carbon source gas can be selected such that the carbon nanotubes produced have an $I_G/I_D$ value of greater than about 4, preferably greater than about 5 using Raman spectra. In addition, the flow rate of the carbon source gas can be selected such that the carbon nanotubes are produced at a high growth rate.

The Raman spectra of SWNTs has three major peaks, which are the G-band at about 1590 $cm^{-1}$, D-band at about 1350 $cm^{-1}$, and the Radial breathing mode (RBM) at about 100-300 $cm^{-1}$. RBM frequency is proportional to an inverse of the diameter of SWNTs and can thus be used to calculate the diameter of the SWNT. Normally, a red shift in RBM peak corresponds to an increase in the mean diameter of SWNTs. The tangential mode G-band related to the Raman-allowed phonon mode $E_{2g}$ can be a superposition of two peaks. The double peak at about 1593 and 1568 $cm^{-1}$ has been assigned to semiconductor SWNTs, while the broad Breit-Wigner-Fano line at about 1550 $cm^{-1}$ has been assigned to metallic SWNTs. Thus, G-band offers a method for distinguishing between metallic and semiconducting SWNTs. The D-band structure is related to disordered carbon, the presence of amorphous carbon, and other defects due to the $sp^2$-carbon network. The ratio of the G-band to D-band in the Raman spectra ($I_G:I_D$ or G/D ratio) of SWNTs can be used as an index to determine the purity and quality of the SWNTs produced. Preferably, $I_G:I_D$ is about 1 to about 500, preferably about 5 to about 400, more preferably greater than about 7. In certain aspects, $I_G:I_D$ can be less than 200. In further aspects $I_G:I_D$ can be between about 5 and about 100.

In another aspect of the invention, the carbon source gas, such as methane, can be mixed with another gas and then delivered to the reaction chamber, preferably at about atmosphere pressure (750 torr). For example, the ratio of partial pressures of the carbon source gas to the inert gas can be about 1:2 to about 1:5, preferably about 1:2 to about 1:4, or more preferably about 1:3 to about 1:4 (torr/torr). Thus the pressure can be about 0.9 to about 1.1 atmosphere, preferably about 0.95 to about 1.05 atmosphere, or more preferably about 0.98 to about 1.02 atmosphere. Thus, typical flow rates can be 200 sccm for argon or helium and 60 sccm for methane, to give a total pressure of 1.025 atmospheres (780 torr) can be used to synthesis higher quality SWNTs. In certain aspects, the total pressure can be between 740 torr and 780 torr.

The temperature of the reaction chamber can be selected to be between about 300° C. and 900° C. The temperature can be selected such that it is preferably kept below the decomposition temperature of the carbon precursor gas. For example, at temperatures above 1000° C., methane is known to break down directly into soot rather than forming carbon nanostructures with the metal growth catalyst. Further, the temperature can be selected such that the formation of non-SWNT products, such as amorphous or disordered carbon, graphite, or multi-walled carbon nanotubes, is minimized. Carbon nanotubes and other carbon nanostructures synthesized in reaction chamber can then be collected and characterized. Thus, when the concentration of the carbon source is reduced by dilution with argon, the onset temperature was found to be 785° C. and when the concentration of the carbon source is reduced by dilution with helium, the onset temperature was found to be 795° C.

In one aspect of the invention, the diameter distribution of the synthesized SWNTs is substantially uniform. Thus, about 90% of the SWNTs have a diameter within about 25% of the mean diameter, more preferably, within about 20% of the mean diameter, and even more preferably, within about 15% of the mean diameter. Thus, the diameter distribution of the synthesized SWNTs can be about 10% to about 25% within the mean diameter, more preferably about 10% to about 20% of the mean diameter, and even more preferably about 10% to about 15% of the mean diameter.

Carbon SWNTs can be synthesized with the yields ranging from about 4 wt % to about 15 wt % (wt % carbon relative to the iron/alumina catalyst). Analysis of transmission electron microscopy (TEM) images of SWNTs produced can be correlated with the size of the catalyst particles. For example, SWNTs can be produced as bundles having an average diameter of about 10 nm to about 15 nm when catalyst particle size is about 9 nm, having an average diameter of about 7 nm to about 12 nm when catalyst particle size is about 5 nm, and having an average diameter about 5 nm to about 10 nm when catalyst particle size is about 1 nm. The diameters estimated from TEM can be confirmed from the radial breathing modes observed by Raman Spectroscopy spectra, using multiple different laser excitations, such as, for example, $\lambda$=1064; 785; 614, 532, 514 and 488 nm.

The concentration of the carbon source in the reaction chamber and reaction duration can be varied to obtain SWNTs of high quality. For example, the reaction temperature can be from about 400° C. to about 950° C., preferably from about 750° C. to about 900° C., or more preferably from about from about 800° C. to about 875° C. The SWNTs produced at the initial setting can be tested for their quality, and the temperature adjusted such that the quality of SWNTs reaches the desired level. Preferably, the reaction temperature is between about 800° C. and 900° C., and the reaction duration is from about 1 min to about 180 min, preferably from about 10 min to about 120 min, more preferably from about 20 min to about 100 min. The quality of the SWNTs produced can be tested, and the reaction duration adjusted such that the quality of SWNTs reaches the desired level. Preferably, the reaction duration is less than about 90 min.

Using the methods and processes of the invention, high quality SWNTs with $I_G:I_D$ of about 4 to about 40 can be manufactured. In some embodiments SWNTs have an $I_G:I_D$ of less than 100 or 5 to 30. The quality of the SWNTs can be controlled by controlling the particle size of the catalyst, the temperature of the reaction, the duration of the reaction, and the concentration of the carbon source gas. In particular, the concentration of the carbon source is decreased such that the onset temperature is increased to about 800° C. to about 900° C., where the concentration can be decreased by either reducing the pressure of the pure carbon source or by diluting the carbon source with an inert gas. The SWNTs thus produced are of greater purity and quality.

The carbon nanotubes and nanostructures produced by the methods and processes described above can be used in applications that include Field Emission Devices, Memory devices (high-density memory arrays, memory logic switching arrays), Nano-MEMs, AFM imaging probes, distributed diagnostics sensors, and strain sensors. Other key applications include: thermal control materials, super strength and light weight reinforcement and nanocomposites, EMI shielding materials, catalytic support, gas storage materials, high surface area electrodes, and light weight conductor cable and wires, and the like.

EXAMPLES

Below are examples of specific embodiments for carrying out the present invention. The examples are offered for illustrative purposes only, and are not intended to limit the scope of the present invention in any way. Efforts have been made to ensure accuracy with respect to numbers used (e.g., amounts, temperatures, etc.), but some experimental error and deviation should, of course, be allowed for.

Example 1

Preparation of the Supported Catalyst

Alumina aerogel supported bimetallic Fe/Mo catalyst (with molar ratio Fe:Mo:$Al_2O_3$ of 1:0.2:10.16) was prepared using the sol-gel method followed by supercritical drying. 5.28 g of aluminum sec-butoxide (97%, Alfa Aesar) was diluted in 35 ml of heated 200 proof ethanol and then 20 ml of 4 μg/ml of $HNO_3$ solution in ethanol was added. The mixture was refluxed at 80° C. with stirring for 2 hours. Then a solution of 426.5 mg of iron (III) nitrate hydrate (99.999%, Puratronic by Alfa Aesar) and 68.7 mg of molybdenum (VI) oxide bis(2,4-pentanedionate) (99%, Alfa Aesar) in 20 ml of ethanol was added. The mixture was refluxed at 80° C. with stirring for 1 hour and then cooled to room temperature. To the room temperature solution was added a solution of 1 ml of ammonium hydroxide (trace metal grade, Fisher) and 1 ml of distilled water in 5 ml of ethanol, under intensive stirring that caused gelation. The gel was left to age overnight and supercritically dried at 270° C. and >100 atm the following day. The aerogel powder was calcinated in air flow at 500° C. for 1 hour and heat-treated in argon flow at 820° C. for 1 hour.

The catalyst was also be prepared using the method described in Harutyunyan et al., NanoLetters 2, 525 (2002). Alternatively, the catalyst was prepared by impregnating support materials in metal salt solutions. The reaction time and metal salt/glycol ratio were changed to control the sizes of nanoparticles. In a typical procedure, $FeAc_2$ in methanol and $MoAc_2$ in methanol were used at a molar ratio of Fe:Mo:$Al_2O_3$ of 1:0.2:15. Under a nitrogen atmosphere, $FeAc_2$ and $MoAc_2$ were added to dietheylene glycol mono-n-butyl ether in the molar ratio of 1 mM:0.2 mM:20 mM. The reaction mixture was mixed under the nitrogen atmosphere using a magnetic stir bar, and heated under reflux for 90 minutes. The reaction mixture was then cooled to room temperature, and $Al_2O_3$ (17 mM) was added at once (molar ratio Fe:Mo:$Al_2O_3$=1:0.2:15). The reaction solution was stirred at room temperature for 15 minutes, and then heated to 150° C. for 3 hours. The reaction was cooled to 90° C. while flowing a stream of $N_2$ over the mixture to remove the solvent. A black film formed on the walls of the reaction flask. The black film was collected and ground with an agate mortar to obtain a fine black powder. The Fe/Mo catalyst supported on alumina powder (Fe:Mo:$Al_2O_3$ of 1:0.12:15) was calcined at 450° C. for 1 hour and then treated under Ar gas flowing at 820° C. for half hour. The resulted powders had a BET surface area of ~40 $m^2/g$.

Example 2

Synthesis of Carbon Nanotubes

Carbon nanotubes were synthesized by using the experimental procedure described in Harutyunyan et al., NanoLetters 2, 525 (2002). The CVD growth of SWNTs was performed using methane as carbon source (flow rate between 3-180 sccm) or $CH_4$/Ar mixture (with $CH_4$ flow rate fixed at 40 sccm and 3, 20, 40 or 80 sccm of Ar), without adding any hydrogen gas to the stream, at 780° C. A scheme of the CVD apparatus used for the synthesis is shown in FIG. 1. The reactor consisted of a quartz tube of 13 mm of diameter and 1 m of length, with a mass spectrometer (MS) attached at the gas outlet in order to in situ follow the catalyst activity during the experiments. The volume of this reactor was selected to provide higher detection signal in the MS for the $H_2$ released in the decomposition of the hydrocarbon gas.

The catalyst was packed on a quartz capsule, and positioned such that the entire gas flow passes through the catalyst ensuring a complete and similar accessibility for the hydrocarbon gas. In a typical experiment, ~100 mg of catalyst was placed inside the reactor in the furnace zone with T~500° C., reduced using $H_2$/He (40/100 sccm), and then the hydrocarbon gas ($CH_4$) was supplied (3-180 sccm). After stabilization of the gas flow (controlled by MS) the sample was rapidly moved into the hot zone (T~680-820° C.) by sliding the furnace over specially designed rails. The fast heating procedure avoids delays in the gas supply and diffusion of the hydrocarbon gas during the filling of the reactor, and, it simplified the observation of the methane consumption in the MS, as the initial level corresponded to the maximum level of methane introduced for the experiment, although a slight delay (t~1 min) occurred due to the time necessary for the sample to reach the synthesis temperature. After completion of the synthesis, the $CH_4$ gas was turned off and the reactor cooled down under Ar gas.

For the sequential introduction of $^{12}CH_4$ and $^{13}CH_4$ gases, two different gas lines equipped with three way valves were used (FIG. 1), in order to minimize any discontinuity in the gas supply, and to be accurate in the time of the switching of gases. $^{12}CH_4$ 99.999% (research grade) from Praxair and $^{13}CH_4$ 98% ($^{13}C$, 99.9%) from Cambridge Isotope Laboratories Inc. were used.

Example 3

Effect of Hydrocarbon Flow Rate on Catalyst Lifetime

Figure 2:
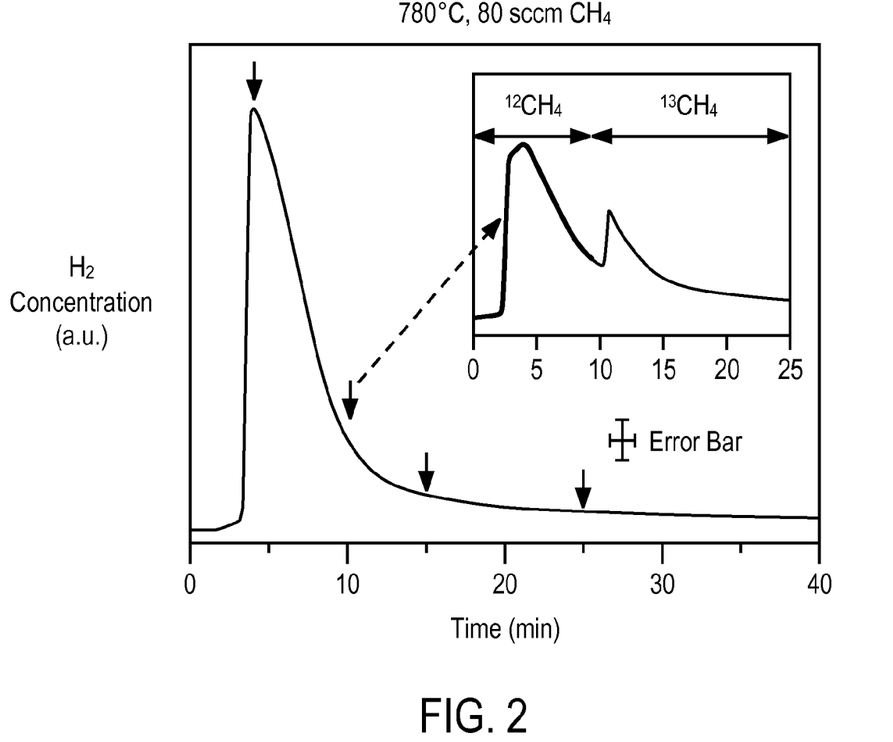
FIG. 2 depicts the production of hydrogen during the synthesis of single-walled carbon nanotubes.

The influence of hydrocarbon flow rate on the catalyst lifetime for nanotubes formation was determined using the Fe/Mo catalyst and 180, 80, 20 and 3 sccm of $CH_4$ as the carbon source gas. The MS, attached at the gas outlet of the CVD reactor (FIG. 1) permits in situ monitoring of the catalyst activity by registering the $H_2$ formed in the decomposition of the $CH_4$ gas ($CH_4 \leftrightarrow 2H_2+C$, $\Delta H=74.4$ KJ/mol). The reaction did not at any time use the combination of hydrogen and $CH_4$ gases during the synthesis. In all cases, the MS curves showed an increase in the $H_2$ concentration (FIG. 2a for 80 sccm), followed by a decrease interpreted as a lessen in catalyst activity, with the catalyst lifetime being estimated around 10-15, 15-20, 20-25, and 120 min for the cases of 180, 80, 20 and 3 sccm, respectively.

Figure 3:
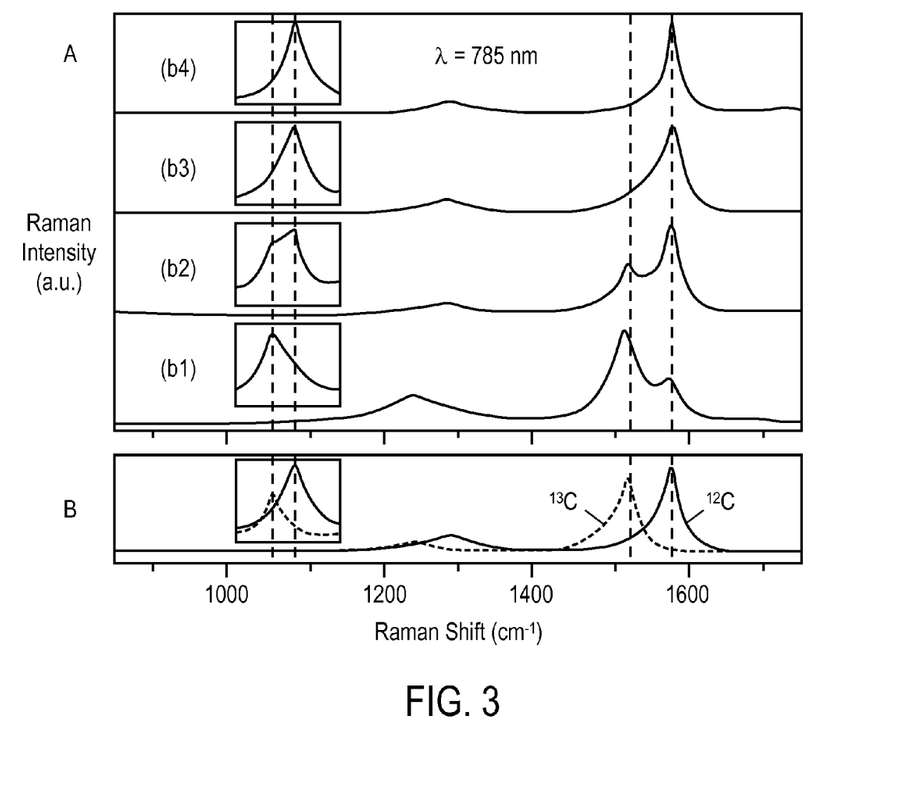
FIG. 3 depicts the Raman spectra of carbon SWNTs.

In order to establish the duration of catalyst activity particularly favorable for nanotube growth, independent samples were prepared under the same experimental conditions as described above, but using sequential introduction of $^{12}CH_4$ and $^{13}CH_4$ gases at different stages of the growth process, and their Raman spectra analyzed. The change between gases was done at times when the catalyst showed high, low or little activity (i.e. arrows in FIG. 2), according to the MS result. The inset of FIG. 2a illustrates the results that correspond to a synthesis performed at 780° C. using 80 sccm of $^{12}CH_4$ for 9 minutes followed by 20 min of $^{13}CH_4$. The "bump" observed in this curve is due to the slight pressure change during the switching of the gases; however, it also allows an accurate determination of the time when the change in the gases was done. FIG. 3 shows the Raman spectra of the samples prepared at 780° C. using a methane flow of 80 sccm, but replacing $^{13}CH_4$ by $^{12}CH_4$ at times when the catalyst shows high (2 min, FIG. 3A, b1), low (8-14 min, FIG. 3A, b2 and b3) and none (23 min, FIG. 3A, b4) activity according to the MS results. When contribution from both C isotopes was observed in the Raman spectrum, we concluded that the catalyst was still active at the time the change of gas was made. However, when contribution from the carbon isotope introduced the last ($^{13}C$) was not observed, then, the catalyst was already deactivated by the time the second gas was supplied. The Raman spectra of the samples obtained using $^{12}CH_4$ for 2 and 8 min followed by 20 min with $^{13}CH_4$ (FIG. 3A, b1 and b2) showed contribution from $^{13}C$ atoms in both the G- and the D-band. On the other hand, the sample prepared using $^{12}CH_4$ for 14 min followed by 20 min of $^{13}CH_4$, showed little contribution from $^{13}C$ atoms (FIG. 3A, b3). Hence, the catalyst lifetime was estimated to be ~18.5±4.5 min. In similar experiments, the lifetime favorable for SWCNT formation was found to be around 10±4 and 12±5 min for 180 and 20 sccm, respectively.

Figure 4A:
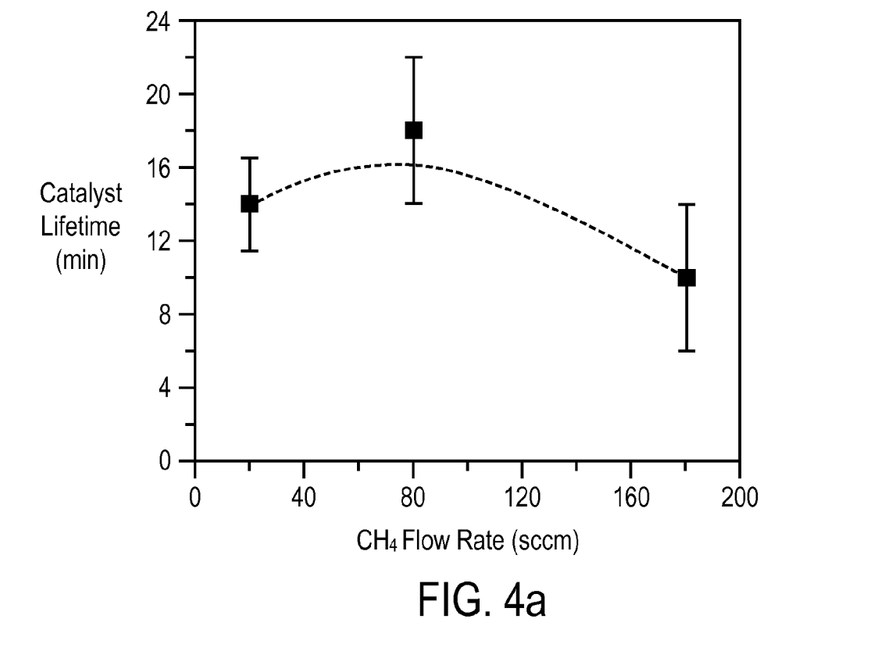
FIG. 4A depicts the dependence of the catalyst lifetime on hydrocarbon flow rate.

The results are summarized in FIG. 4a that shows the dependence of the catalyst lifetime favorable for SWCNT growth with the hydrocarbon flow rate. The catalyst lifetime decreases as the hydrocarbon flow rate increases. Without being bound to any theory, the rapid loss of activity of the catalyst for very high flow rates could be due to coating of the catalyst particles by carbon (either nanotubes or disordered carbon).

Figure 4B:
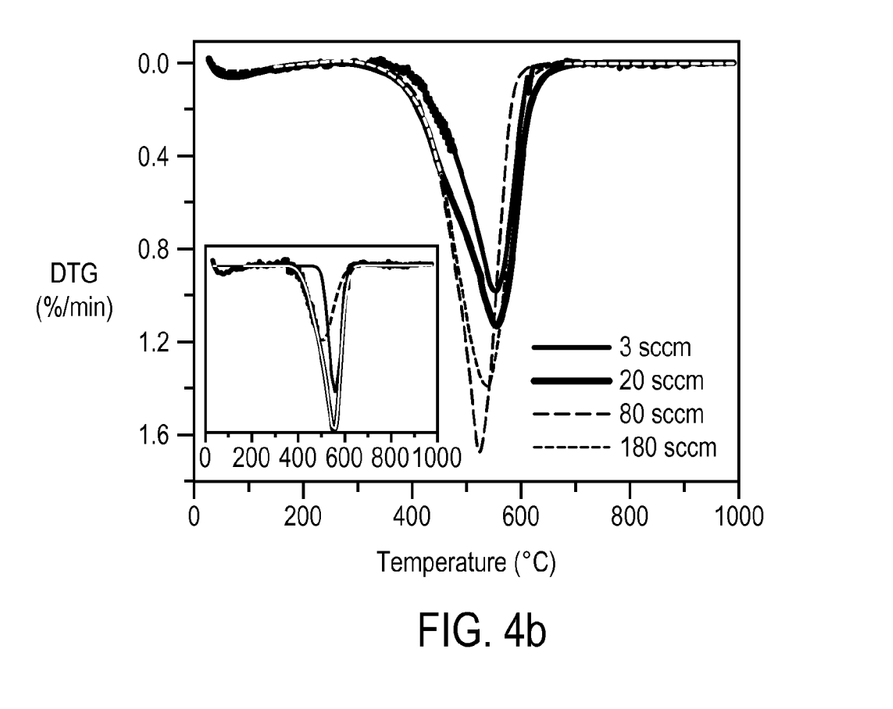
FIG. 4B depicts the thermogravimetric (TGA) profiles of the carbon soot obtained at 780° C. with 180, 80, 20 and 3 sccm of $CH_4$ and Fe:Mo catalyst supported on alumina.

The TGA analyses (FIG. 4B) showed similar carbon uptake for the samples using carbon source flow rates of 20, 80 and 180 sccm (~32-34 wt %) and a slightly smaller one for 3 sccm (24 wt %), pointing out an increase of nanotube growth or carbon coated rates. The DTGA curves (FIG. 4b) show a main band in all four cases centered ~538, 528, 555 and 553° C., for 180, 80, 20 and 3 sccm, respectively. The curves for 3 and 20 sccm can be fitted with two Gaussian curves (inset in FIG. 4b corresponds to 3 sccm), one centered at ~504° C. and another ~550° C., while the curves for 80 and 180 sccm contain mainly high temperature component. The low temperature peak was attributed to the disorder $sp^2$ structures and high temperature one to the nanotubes. On the other hand, the ratio between the intensities of the G- and D-bands ($I_G/I_D$) in the Raman spectra increases when increasing the hydrocarbon flow rate, from $I_G/I_D$~1 to $I_G/I_D$~6 (laser wavelength of λ=532 nm). The result indicates that the disorder band, which is a common feature of disordered $sp^2$ hybridized carbon materials, has a strong contribution for the samples obtained at the lowest hydrocarbon flow rates. However, according to the TGA analysis the content of amorphous $sp^2$ carbon coatings in the samples is small. For SWCNTs, it is considered that the D-band intensity also depends on random characteristics, such as defects in the nanotube lattice (vacancies, impurities) or the finite size of the nanotubes, which break the translation symmetry along the nanotube axis. Therefore, the combination the TGA and Raman results suggests that the low flow rate of hydrocarbon results in more defective carbon structures (SWCNTs).

The experimental results were quantitatively analyzed using the carbon atoms concentration ($N_C$) per particle instead of the hydrocarbon flow rate, as the latter strongly depends on the geometry of the experimental setup, accessibility to and amount of catalyst. In Table 1 shows the supplied $CH_4$ molecules concentration per catalyst particle, efficiency of carbon formation (conversion rate), carbon concentration per particle ($N_C$) and growth rate of SWCNTs for $CH_4$ flow rates 20 80 and 180 sccm, respectively.

Figure 5:
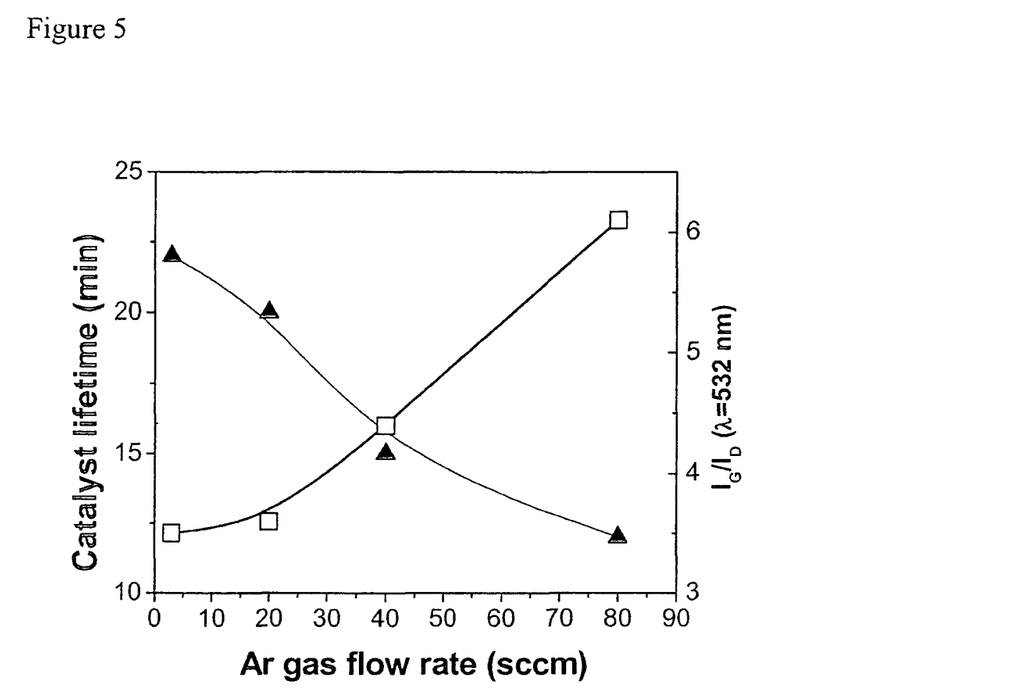
FIG. 5 depicts the dependence of the catalyst lifetime favorable for SWCNT growth and Raman intensity ratio of the G and D-bands ($I_G/I_D$) with the transport gas (Ar) flow rate, when using 40 sccm of $CH_4$.

On the other hand, when using a fixed amount of $CH_4$ flow rate of 40 sccm, the addition of increased amounts of Ar as transport gas (from 3 sccm up to 80 sccm), resulted in a slight decrease in the catalyst lifetime, according to the MS results, from ~22 to 15 min (FIG. 5). However, the effect of the addition of transport gas was clearly reflected in an improvement of the grown SWCNTs quality, as concluded from the increase in the $I_G/I_D$ values from the Raman spectra (from ~3.5 for 3 sccm of Ar to ~6 for 80 sccm of Ar added to the $CH_4$ gas stream).

Thus, the growth rate and quality of the single-walled carbon nanotubes can be controlled using flow rates of the hydrocarbon source gas. Under the studied conditions, the maximum conversion rate of methane into carbon was found ~20.1% (for 20 sccm at 780° C.), however the highest value of carbon atoms supply rate $N_C$~380 C atoms/sec particle was achieved in case of 180 sccm methane flow rate, that corresponds to the growth rate 0.0024 μm/sec. The slowest growth rates of ~0.0012 μm/s (corresponding to 194 C atoms/sec particle) results in a relatively high defective product, while an increase in the growth rate to 0.0024 (obtained with 180 sccm of $CH_4$) resulted in an improvement of the SWCNTs grown quality. Moreover, the addition of transport gas along with the hydrocarbon gas resulted also in an improvement of the quality of the nanotubes grown.

While the invention has been particularly shown and described with reference to a preferred embodiment and various alternate embodiments, it will be understood by persons skilled in the relevant art that various changes in form and details can be made therein without departing from the spirit and scope of the invention. All printed patents and publications referred to in this application are hereby incorporated herein in their entirety by this reference.

We claim:

1. A method for synthesizing carbon single-walled nanotubes (SWNTs), the method comprising:
    contacting a supported metal catalyst, the supported metal catalyst comprising a support and a metal, with a carbon precursor gas, wherein the carbon precursor gas has a pressure of one atmosphere and a flow rate of 180 sccm, wherein SWNTs are synthesized at a growth rate of

TABLE 1

| Flow rate[a] (sccm) | $CH_4$ molecules passed/particle[b] | Efficiency[c] (%) | $N_C$[d] | C atoms/sec particle[e] | SWCNT growth rate[f] (μm/sec) |
|---|---|---|---|---|---|
| 20 | 1.3 10⁶ | 20.1 | 2.62 10⁵ | 194 | 0.0012 |
| 80 | 4.6 10⁶ | 6.5 | 2.60 10⁵ | 248 | 0.0016 |
| 180 | 6.4 10⁶ | 4.5 | 2.85 10⁵ | 380 | 0.0024 |

[a]$CH_4$ flow rate (sccm),
[b]$CH_4$ molecules passed/particle during their lifetime,
[c]Efficiency of $CH_4$ conversion into carbon (%),
[d]$N_C$: Carbon atoms formed/particle The results show that, even though $CH_4$ flow rate was increased nine times and was arranged for maximum accessibility to the catalyst surface (inset in FIG. 1), the number of molecules per particle increased only ~5 times due to the different lifetime of the catalyst, and the average carbon atoms concentration per second per particle varied from 194 to 380 Catoms/sec particle depending on the flow rate. This corresponds to growth rates of 0.0012, 0.0016 and 0.0024 μm/sec for the flow rates of 20, 80 and 180 sccm, respectively. Therefore the fastest growth rate with better nanotubes quality was obtained with a flow rate of 180 sccm, for the experiment geometry used here, even though the catalyst lifetime was the shortest.

0.002 μm/sec to 0.003 μm/sec and the SWNTs have a ratio of G-band to D-band in Raman spectra ($I_G:I_D$) of greater than 4.

2. The method of claim 1, wherein the metal is a Group V metal, a Group VI metal, a Group VII metal, a Group VIII metal, a lanthanide, a transition metal, or a mixture thereof.

3. The method of claim 2, wherein the metal is Fe in combination with V, Nb, Cr, W, Mo, Mn, Re, Co, Ni, Ru, Rh, Pd, Os, Ir, Pt, Ce, Eu, Er, Yb, Ag, Au, Zn, Cd, Sc, Y, La, or a mixture thereof.

4. The method of claim 3, wherein the metal is Fe in combination with Ni, Co, Cr, Mo, or a combination thereof.

5. The method of claim 4, wherein the metal is Fe and Mo.

6. The method of claim 1, wherein the support comprises a powdered oxide.

7. The method of claim 6, wherein the powdered oxide is $Al_2O_3$, $SiO_2$, MgO, or zeolites.

8. The method of claim 7, wherein the powdered oxide is $Al_2O_3$.

9. The method of claim 1, wherein the catalyst and the support are in a weight ratio of 1:1 to 1:50.

10. The method of claim 9, wherein the weight ratio is 1:10 to 1:20.

11. The method of claim 1, wherein the carbon precursor gas comprises carbon monoxide, methane, ethane, propane, butane, pentane, hexane, ethylene, acetylene, propylene, acetone, or methanol.

12. The method of claim 11, wherein the carbon precursor gas comprises methane or carbon monoxide.

13. The method of claim 11, wherein contacting a supported metal catalyst with a carbon precursor gas comprises contacting the supported metal catalyst with a combination of the carbon precursor gas and an inert gas, wherein the total pressure of the combination of the carbon precursor gas and the inert gas is 740 torr to 780 torr.

14. The method of claim 13, wherein the inert gas is argon, helium, nitrogen, or a combination thereof.

15. The method of claim 13, wherein the inert gas is argon, helium, nitrogen, hydrogen, or a combination thereof.

16. The method of claim 1, wherein the ratio of $I_G:I_D$ is less than 200.

17. The method of claim 16, wherein the ratio of $I_G:I_D$ is 5 to 100.

18. The method of claim 17, wherein the ratio of $I_G:I_D$ is 5 to 30.

19. The method of claim 1, wherein the metal and the support are in a weight ratio of 1:10 to 1:20, the ratio of $I_G:I_D$ is greater than 5, and the metal comprises Fe and Mo.

20. The method of claim 19, wherein the ratio of $I_G:I_D$ is less than 100.

* * * * *